(12) United States Patent
Pershan

(10) Patent No.: US 7,123,702 B1
(45) Date of Patent: Oct. 17, 2006

(54) METHODS AND APPARATUS FOR BILLING CONFERENCE CALLS

(75) Inventor: Barry Paul Pershan, Olney, MD (US)

(73) Assignee: Verizon Services Corp., Arlington, VA (US)

( * ) Notice: Subject to any disclaimer, the term of this patent is extended or adjusted under 35 U.S.C. 154(b) by 428 days.

(21) Appl. No.: 10/108,083

(22) Filed: Mar. 27, 2002

(51) Int. Cl.
H04M 15/00 (2006.01)
H04M 3/42 (2006.01)

(52) U.S. Cl. .............. 379/114.01; 379/114.28; 379/127.03; 379/202.01

(58) Field of Classification Search ........... 379/114.01, 379/114.28, 127.03, 202.01
See application file for complete search history.

(56) References Cited

U.S. PATENT DOCUMENTS 5,666,405 A * 9/1997 Weber ................. 379/127.03
5,757,894 A * 5/1998 Kay et al. ............. 379/127.03
6,427,008 B1 * 7/2002 Balaz .................. 379/202.01
6,980,632 B1 * 12/2005 Brown et al. .......... 379/114.28
2003/0156697 A1 * 8/2003 Svercek ................ 379/202.01

* cited by examiner

Primary Examiner—Barry Taylor

(57) ABSTRACT

Methods and apparatus for billing communications services through the use of AIN functionality are described. Billing information is communicated to a service control point by placing one or two calls to a service subscriber to be billed for a service. The calls encounter a trigger set at a switch. In response to trigger activation the switch sends a message to the service control point. The message includes billing information placed into a billing data field of the call. The service control point extracts the billing information received in the message or messages from the switch and bills the called service subscriber based on the received billing information. In the single billing call embodiment the device initiating the billing call is responsible for determining the amount of time for which the service is to be billed, e.g., conference duration, in addition to other billing information.

25 Claims, 7 Drawing Sheets

METHODS AND APPARATUS FOR BILLING CONFERENCE CALLS

FIELD OF THE INVENTION

The present invention is directed to communications systems and, more particularly, to methods and apparatus for billing a conference call, for example, to a particular telephone number.

BACKGROUND OF THE INVENTION

Conference calls have many uses in our society. For example conference calls can be used by businesses to hold meetings with clients located in various parts of the country. A business owner located Maryland can conference with a potential customer in New York and a supplier located in California.

Conference calls can also be used for personal reasons. For example conference calling functionality may be used to provide family members located at different locations the ability to talk to each other as a group.

The ability to initiate conference calls may be provided as part of a particular telephone service, e.g., a Centrex service package or family communications service, or as a separate service.

Various conference call services are available that can establish a connection between multiple users. Normally an individual seeking to set up a conference call calls the conference call service, indicates the number of call participants and the time of the call. In such known services, at the time the individual sets up the conference call, the individual also provides billing information. This may be credit card information or, in some cases, a business account information. Once the necessary conference call set up information is obtained, the individual setting up the call is usually provided with a call-in number and a PIN. Conference call participants call the provided number at the time of the scheduled call, enter the PIN and are then placed into conference with each other.

After the conference call is completed, e.g., by the participants hanging-up their phones, the conference call is billed to the credit card or business account which was identified at the time the conference call was initially set up. This normally results in the charge for the conference call being reflected on a credit card bill or on a separate business account invoice.

Known conference call services of the type described above can be implemented using conference bridges or peripheral devices coupled directly to a telephone switch. In such known implementations, the telephone number called to setup a conference call and to participate in a conference call normally corresponds to that of the conference bridge or peripheral device used to provide the conference call service.

In order to provide new sources of revenue and provide needed or desired services to customers, telephone companies are increasingly relying on advanced intelligent network (AIN) functionality to provide services which include, among other things, conference calling functionality. Examples of such services include advanced call forwarding and/or call screening services where a call to a particular phone number may trigger calls to multiple phone numbers. As the call to each phone number is answered, the answering party may be placed into conference with the calling party. Such a service may be desirable, e.g., where individuals located at different locations are responsible for servicing a particular customer account.

While the above described billing techniques work satisfactorily in the case of pure conference calling services, such billing techniques are not very well suited for advanced telephone services which involve the automatic setup and establishment of conference calls, e.g., through the use of AIN functionality used in combination with a conference bridge or peripheral device with conference calling capabilities.

In the case of AIN based services, service control logic in a service control point (SCP) is often responsible for the automatic initiation of a conference call in response to activation of an AIN trigger set on a telephone service subscriber's line. In the case of such automatic conference call setup and establishment, there normally will be no call to setup and schedule the conference call during which billing information can be collected. Furthermore, in the case of advanced telephone services, it is often the called party who is the subscriber to the service. As part of the service it is often desirable to bill the service subscriber and not the call participants for the cost of the conference call.

From a convenience standpoint, it is often desirable to bill a service subscriber for services associated with a particular telephone number on a monthly basis. Telephone switches include functionality for generating a log of telephone services that are to be billed to a particular telephone number, i.e., a bill for the logged service is to be sent to a service subscriber associated with the telephone number to which a call or other telephony service is billed. Alternatively, it may be desirable to output billing information to a third party or other device in a manner which allows the billing information to be processed and billed to a service subscriber, e.g., on a monthly basis.

The lack of a conference call setup call in which billing information can be collected, the automated conference call initiation process and the potential for an unknown number of call participants at start of a conference call initiated as an advanced telephone service tend to complicate conference call billing operations.

In the cased of advanced telephone services, it often desirable to bill a conference call to a specific phone number associated with the service. For example, family or a business, which uses conference call services, may wish to receive their conference call bills as part of their monthly telephone billing statements. This way all telephone activity can be reviewed in a single bill corresponding to one or more phone numbers, rather than in separate bills.

In view of the above discussion, it can be appreciated that there is a need for new methods and apparatus for billing conference call services. The need is particularly noticeable in the case of AIN based services where a conference call may be automatically initiated as part of an advanced telephone service provided through the use of service control logic present in a SCP. Accordingly, there is a need for new conference call billing methods and apparatus. It is desirable that at least some of the new methods and/or apparatus be capable of determining the number of conference call participants or number of calls initiated as part of a conference call and the duration of the conference call. It is also desirable that at least some methods and apparatus allow the conference call to be billed automatically to a telephone number associated with the telephone service which includes conference call functionality. It is also desirable that at least some billing methods and apparatus allow for conference calls to be billed independently from a bill associated with other services associated with a particular telephone number thereby allowing for 3$^{rd}$ party billing and billing to credit cards. To allow for billing of AIN based conference call services, it is desirable that at least some billing methods be suitable for use in conjunction with AIN based services and the use of SCP logic to provide telephony services.

SUMMARY OF THE INVENTION

The present invention is directed to methods and apparatus for billing of communications services, e.g., conference call services, through the use of AIN functionality.

Peripheral devices are often used in an AIN system to provide various services such as conferencing services. These services may be included as part of a larger service package offered to the service subscriber. From a billing perspective it is often desirable to be able to bill the services provided by a peripheral device based on actual use, e.g., in addition to or as an alterative to a monthly flat fee for the service or service package.

Peripheral devices such as the ones used to provide conference calling services, can initiate calls but can not directly bill subscribers for provided services. The present invention uses an IP's ability to track calls and to place information in one or more of the data fields transmitted along with the voice portion of a call to communicate billing information to a Service Control Point (SCP). The SCP then either outputs the billing information via an output device located at the SCP or communicates the billing information to a telephone switch to be included on the log of services to be billed to a service subscriber with which a particular telephone number is associated. In various embodiments the SCP is implemented as an integrated service control point (ISCP).

An IP normally has the ability to track the number of calls made as part of a service, e.g., to initiate a conference call and the number of call participants (bridged parties) as in the case of a conference call. An IP can also determine the duration of a call or how long a particular service is provided. These capabilities along with an IP's ability to initiate a call to a party to whom the service is billed is used in accordance with the present invention to communicate billing information to the SCP.

Billing of conference calls may be performed, for example, as follows:

Billed charge=conference duration x number of calls x per minute charge.

The billing information (# of calls) and duration (conference time) is conveyed to the SCP which is responsible for the billing through the use of one call (a single billing call embodiment) or two calls (a two call billing embodiment). In each embodiment, the billing calls are initiated by the IP and directed to the telephone number to which the calls are to be billed.

In the single billing call embodiment, the IP is responsible for determining the conference call duration as well as the number of completed calls initiated by the IP that were included in the conference call being billed. When the IP places the billing call to the telephone number to which the conference calls are to be billed, the IP inserts in a billing field of the TCAP message portion associated with the call the number of telephone calls which are involved in the conference and the conference duration. A telephone number corresponding to the IP will be included in the calling party field since it initiated the call. For example, in the case of a 2 way conference where the IP initiated both calls, the billing field would include information indicating that 2 calls were to be billed as well as the call duration, e.g., in minutes or some incremental portion thereof.

A terminating attempt trigger (TAT) is set at the billing party's (service user's) switch, when the billing call hits the TAT, a message is sent to the SCP including the information from the calling party number and billing field. When the SCP gets the message, based on the fact that the calling party field includes the IP's phone number and the billing field includes the number of calls to be billed, the SCP knows that it is to initiate a billing operation to the called party's number for the number of calls indicated in the billing field. Billing information is then output to the switch so that the call can be billed or to a third party billing center.

In the case of the two call billing embodiment, the IP transmits a call to the party to be billed at the start of the telephone conference. This call activates the TAT set on the service subscriber's line and a message is sent to the SCP. The SCP stores the time the message was received and instructs the switch to terminate the first billing call. At the end of the conference call, a second call is placed by the IP to the service subscriber. The IP includes the number of successfully completed calls initiated by the IP as part of the conference service in the billing field of the second call. The second billing call activates the TAT set at the switch resulting in a second message being sent to the SCP. The second message includes the calling party and billing field information included in the second billing call. The SCP recognizes from the calling party field that the second billing call is from the IP and determines the duration of the conference call by calculating the difference in time between when the message corresponding to the first billing call was received and the time at which the message corresponding to the second billing call was received. It also extracts the number of calls information from the billing field of the received second message. Using this information the SCP proceeds to bill the service subscriber for the conference call as in the case of the single billing call embodiment.

While described in the context of billing for a conference call service the methods and apparatus can be used to convey billing information to an SCP for a wide variety of services.

Numerous features, advantages and exemplary embodiments of the present invention are discussed in the detailed description which follows.

DETAILED DESCRIPTION

Figure 1:
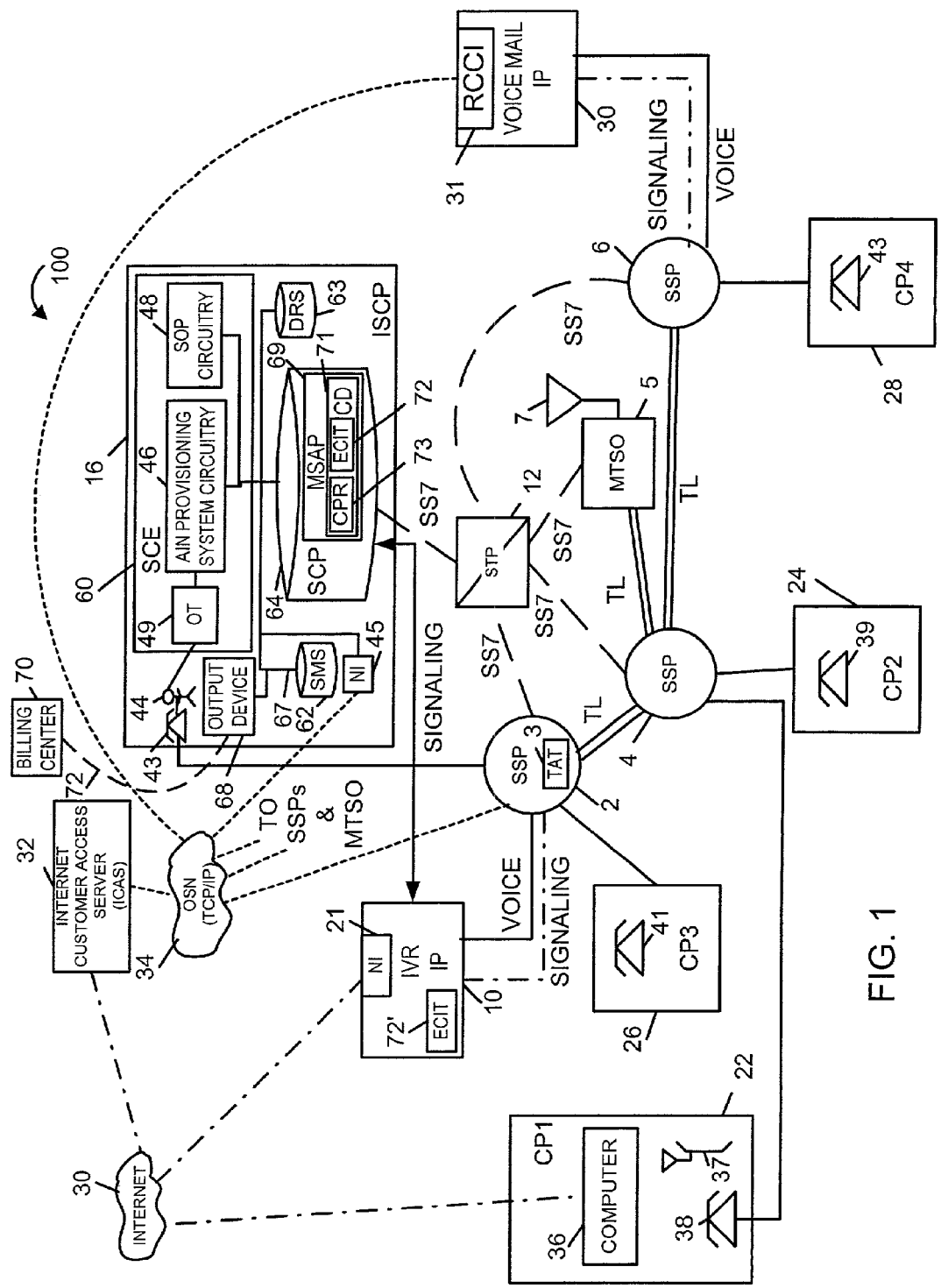
FIG. 1 illustrates a communication system implemented in accordance with an exemplary embodiment of the present invention.

FIG. 1 illustrates a communication system 100 implemented in accordance with an exemplary embodiment of the present invention. The system 100 supports a group contact service which, in some embodiments, is implemented as an emergency contact service. The exemplary contact service can be used in times of emergency to quickly place members of a group, e.g., family, in contact with each other. The exemplary group connection service utilizes conference calling functionality of an intelligent peripheral 10 to initiate a conference call to various predetermined telephone numbers when a call to the service subscriber's telephone number goes unanswered for a period of time. The emergency contact service is an example of an AIN based telephone service which incorporates as a feature, the ability to automatically initiate a conference call in response to a call to a subscriber going unanswered and/or input being received from the calling party selecting individuals to be contacted. The conference call billing features of the present invention will be explained in the context of this exemplary connection service with the understanding that the billing methods and apparatus of the present invention can be applied to a wide variety of conference calling applications and services.

The system 100 includes routines, call processing logic and hardware for providing communications services including conference call functionality. In the system 100 conference calls are billed using one or more methods of the present invention. The system 100 supports communications via the Internet 30, as well as the public switched telephone network (PSTN). The PSTN includes a plurality of signal switching points (SSPs) 2, 4, 6 which, as is known in the art, may be implemented using known Class 4 and/or Class 5 telecommunications switches, e.g., telephone switches, capable of supporting the signaling system seven (SS7) protocol. Each SSP 2, 4, 6 may correspond to a different telephone central office. Trunk lines (TLs), which may comprise, e.g., one or more T1 lines, interconnect the various SSPs 2, 4, 6. In addition to SSPs 2, 4, 6, the system 100 includes a mobile telephone switching office (MTSO) 5 for servicing mobile telephone calls. The calls may be received via antenna 7. The MTSO 5 is coupled to one or more SSPS, e.g., SSP 4 via trunk lines. In this manner, cellular telephone calls can be routed and processed via an SSP 4 allowing interaction with land line telephones.

Each SSP 2, 4, 6 is normally connected to one or more customer premises (CP) which may include, e.g., residences and/or offices. In the FIG. 1 example, first and second customer premises 22 and 24 are coupled to the second SSP 4, third customer premises 26 is coupled to the first SSP 2 while the fourth customer premises 28 is coupled to SSP 6. Connections between the SSPs and CPs may be by POTS lines, ISDN lines, DSL, or other known communications lines.

Communications equipment, referred to as customer premise equipment (CPE) is located at each customer premises 22, 24, 26, 28. Customer premise equipment may include, e.g., telephones, faxes, computers, etc. In FIG. 1, a computer 36, land-line telephone 38, and mobile telephone 37 are shown as being located at the first customer premises 22. Since cell phone 37 is a mobile communications device it need not be physically located at the first customer premises to operate. The computer 36, located at the first customer premises 22 is coupled by any one of a plurality of known connection techniques, e.g., telephone dial-up, ISDN, DSL, etc., to the Internet 30, also known as the World Wide Web.

While the second, third and fourth customer premises 26, 28 are illustrated as including only landline phones, it is to be understood that they may have any number of communications devices including, e.g., telephones, faxes, and computer devices. Additional telephone service subscribers may be coupled to any one of the SSPs 2, 4, 6.

The system 100 is implemented using advanced intelligent network (AIN) techniques. Accordingly, the processing of calls directed to a customer's telephone line and received by an SSP from a telephone customer's line may be controlled by instructions included in customer call processing records (CPRs). In the system 100, the CPRs are stored at an SCP 64. The CPRs may include sequential contingent call processing instructions in the form of a next event list (NEL). At least one CPR exists for each subscriber to an AIN based service. A customer's CPR is accessed in response to activation of an AIN trigger set at, e.g., the SSP 2, 4, or 6 to which the subscriber's line or lines are connected, e.g., by POTS lines.

The ISCP 16 includes a network interface (NI) 45, a service management system (SMS) 62, data and reporting system (DRS) 63, service creation environment (SCE) 60, an SCP 64 and an output device 68. A local network 67 couples the various components of the ISCP 16 together.

The network interface 45 couples the ISCP 16 to various other components of the PSTN via a TCP/IP based network referred to as an operational services network (OSN) 34. The OSN 34 interconnects SSPs 2, 3, 6, the MTSO 5, Intelligent Peripherals (IPs) 18, 10, 20, and the ISCP 16. Thus, the OSN 34 is a network over which control and signaling information can be passed between the various system components, e.g., using TCP/IP. In addition to being connected to the OSN 34, ISCP 16 is connected, via its SCP 64, to the SSPs and MTSO via one or more signal transfer points (STPs) 12 and Signaling System Seven (SS7) interconnects over which messages, data, and requests for call processing control instructions can be communicated between the SSPs 2, 4, 6, or MTSO 5 and ISCP 16 in accordance with the SS7 protocol.

The SCP 64 includes a multi-service application platform (MSAP) database 69, which includes customer data (CD) 71 for each of a plurality of other service subscribers. The customer data 71 includes, for each customer: 1) a list of the services to which the customer subscribes; 2) a password which may be input via DTMF signals; 3) a call processing record (CPR) 73 which is used to instruct an SSP how to process a call in response to one or more AIN triggers to thereby implement the services to which the customer subscribes; and 4) an emergencies contact information table (ECIT) 72 that includes information used to initiate conference calls as part of an emergency contact service. The subscriber's ECIT 72 may be a duplicate of an ECIT 72' stored in the IP 10. In some embodiments the SCP 64 obtains information from the ECIT 72' in the IP 10. The SCP 64 supports several telephone services, e.g., emergency communications service, call forwarding, call screening and voice mail.

The customer data 71 which includes one or more call processing records 73 is generated, at least initially, by the SCE 60 in response to input received from a service representative or operator 44. Customer data in the database 71 and the CPR 73 may, after initial provisioning of a service for a customer, be updated by the customer via telephone or via the Internet through the use of a Web browser.

Billing of telephone services may be performed by the SCP 64, which is coupled a communication link 72 to a billing center 70 via output device 68. The output device 68 includes routines for communicating with the billing center. Therefore, the SCP 64 can use the output device 68 to generate billing messages for the billing center, which may accept messages, e.g., in the Bellcore Automatic Message Accounting (AMA) Format (BAF) and/or in ASCII format.

The SCE 60 includes an operator terminal (OT) 49, service order processing circuitry 48 and AIN provisioning system circuitry 46. The operator terminal 49 is used by the service representative 44 to enter service information, e.g., to create a service account for a new subscriber. The entered data may be information, e.g., relating to the addition of a new customer, the adding of a service for an existing customer, and/or the cancellation of a service being provided to an existing customer. The service order processing circuitry 48 is used to generate service orders, e.g., orders to add or cancel a service, in response to service information entered into the operator terminal 49. The AIN provisioning system circuitry 46 is responsible for setting and/or updating AIN triggers at the various signal switching points (SSPs and MTSO) required to implement a service order generated by the service order processing circuitry 48. In addition to setting AIN triggers, the AIN provisioning system circuitry 46 is responsible for generating and/or updating customer data 71, e.g., call processing records 73, ECIT 72, 72' and other information stored in various locations in the system 100, as required to implement a service order. The customer data may include billing information, e.g., indicating whether conference calls initiated as part of the emergency contact service are to be billed to the subscriber's telephone number, e.g., on the subscriber's monthly telephone billing statement, or a credit card. Such billing information may be included in emergency contact information table 72.

As will be discussed below, various IPs 10, 30 are used to provide services to telephone service subscribers. Thus, in addition to updating information in the customer database 71, the AIN provisioning system circuitry 46 is responsible for updating information in the various IPs 10, 30 as required. The updating of the IPs and the setting of AIN triggers can be performed by the AIN provisioning system circuitry 46 through communications with the various system components conducted using the OSN 34 and/or via SS7 links.

Once service to a customer has been initially configured by a service representative 44, a service subscriber, e.g., an emergency communications service subscriber can update various service information though the use of a personal computer and a Web Browser application. Known browsers which can be used for this purpose include Internet Explorer, Netscape, etc.

In the FIG. 1 system, the service subscriber to whom the first customer premises corresponds can update the subscriber's service information, e.g., emergency contact service information stored in tables 72, 72', via the use of computer 36 and an Internet connection the service subscriber can contact the Internet Customer Access Server (ICAS) 32. The server 32 serves as a secure gateway via which emergency communications service subscribers can update and configure their telephone service information using a computer coupled to the Internet. The ICAS 32 includes security routines, e.g., a firewall, designed to prevent individuals other than the subscriber gaining access to and/or modifying via the Internet, subscriber service information. The ICAS 32 is coupled to the OSN 34 thereby allowing a customer, upon satisfying various security checks, to access and modify service information stored in any one of the various network devices, e.g. SCP 64, and/or IP 30, coupled to the OSN 34.

In order to implement various services, such as an emergency communications service and voice mail, intelligent peripheral (IP) devices such as IPs 30 and 10 are used. The first IP 10 is an interactive voice response (IVR) IP which is capable of, and includes circuitry for, performing speech recognition and/or DTMF signal detection operations as well as playing voice prompts and other messages to a telephone service subscriber.

IVR IP 10 is coupled to the first SSP 2 via audio (voice) lines. It is also coupled to the OSN 34 and the Internet 30 through a network interface (NI) 21. The IVR IP 10 may be implemented using known hardware and includes circuitry and/or software for implementing steps of the present invention. This includes circuitry for generating and sending E-mail messages.

The second IP 30 is a voice mail IP which provides voice mail service to voice mail telephone service subscribers. In accordance with one feature of the present invention, voice mail service is provided to emergency communications service subscribers. However, voice mail service is not an absolute requirement for implementing the communication service of the present invention. A subscriber can access his/her mailbox by calling a telephone number associated with the voice mail IP. When connected to the voice mail IP, a voice mail service subscriber can enable/disable voice mail.

As described earlier a conference call service may be used, e.g., as part of a group connection, e.g., emergency contact, service. The group connection service allows members of a group, e.g., a family, to dial a dedicated, e.g., "800" number, and enter into an ECIT their current contact information, e.g., a phone number, and optionally a voice message. In the event of a national or family emergency, the members of the group, e.g., family, can call the home family number to determine the status of other family members. If there is a person at home, he or she can relay information to the rest of the family, but if there is no one home, the group connection service offers a conference call service to the caller. In some cases the conference call service option is made contingent on the caller first being determined to be a member of the group, e.g., family, for which the group connection service is provided. This determination may be based on calling party telephone number information or other automatic number identification (ANI) information received as part of a call.

If the caller chooses to use the offered conference calling service to contact other group members, e.g., family members, the IP 21 uses the current contact information listed in the ECIT to initiate calls to each member of the group with the exception of the caller. When a called party answers, they are placed into conference with the calling party.

From a billing standpoint, it is desirable for the telephone company to be able to charge for conference calls based on the number of placed calls which are answered, the number of call participants and/or the duration of the conference call.

A first method for billing a conference call initiated as part of an exemplary AIN service, e.g., a group connection service will now be described with reference to FIG. 2.

FIG. 2, which comprises the combination of FIGS. 2A–2D, illustrates the steps 200 of the exemplary group, e.g., family, connection service in which conference calls are made and billed in accordance with the invention. The method 200 may be implemented by the system 100 shown in FIG. 1. The billing method used in the FIG. 2 example may be described as the two call method because the conference calling IP initiates two calls as part of the inventive conference call billing process.

The method 200 starts in step 202 with a AIN trigger, e.g., a terminating attempt trigger (TAT) being set on the family telephone line. The TAT 3, is set at the telephone switch to which the family residence is coupled, e.g., telephone switch 2 assuming the family residence is CP3 26.

Operation proceeds from start step 202 to step 204 wherein the AIN trigger, e.g., TAT 3, is activated at the SSP 2 by a call to the family number. Next, in step 206, in response to activation of the TAT 3, the SSP 2 pauses the call, and then in step 208 the SSP 2 sends a message, e.g., a TCAP message, to the SCP 64. In step 210, the SCP 64 accesses a Call Processing Record (CPR) 73 using the called party number, i.e., the family telephone number, to identify the CPR 73 to be accessed.

Under control of information in the accessed CPR 73, in step 212 the SCP 64 determines if the calling party number, included in the received TCAP message, is listed in the emergency contact information table (ECIT) 72 as a number corresponding to a family member. If the calling party number is listed in ECIT 72, method 200 proceeds to step 216 otherwise operation proceeds to step 218. In both steps 216 and 218 the SCP 64 generates a message which is used to control call processing by the SSP 2.

In step 216, which is encountered when a calling party calls from a phone corresponding to a family member, a message is generated for the SSP 2 that causes the call to be completed to the family telephone number with a special ring and with a NEL T_busy, T_no_answer and T_answer event notification set. The special ring, e.g., any one of a plurality of distinctive rings by the SSP 2, is used to indicate to the called party that the call is from a listed family member. The NEL information is used to cause the SSP 2 to provide information back to SCP 64 regarding call completion. Operation proceeds from step 216 to step 220.

In step 218, which is encountered when a calling party telephone number is not listed in the information table 72', the SCP 64 generates a message to the SSP 2 with NEL setting information. The message causes the SSP 2 to complete the call to the called family number with a conventional ring. The setting of the NEL causes the SSP 2 to provide call completion information to the SCP 64. Operation proceeds from step 218 to step 220.

In step 220 the SCP 64 transmits the message generated in either step 216 or 218 to the SSP 2. Next, in step 222, the SSP 2 receives the message from the SCP 64 with instructions on how to proceed with the call. Operation proceeds from step 222 to step 226 via connecting node 224.

In step 226, the SSP 2 completes the call to the called family telephone number while setting the NEL functionality used to report call completion information to the SCP 64. If the calling number was listed in the ECIT 72, the SSP 2 causes the special ring used to indicate a call from a family member to be produced.

In step 230 the SSP 2 determines the call completion status, e.g., the SSP 2 determines if the line was busy, if no one answered the phone or if the phone was answered. In step 232 the SSP 2 transmits the call completion information to the SCP 64. The SCP 64 receives the transmitted call completion information in step 234 and then operation proceeds to step 236.

In step 236, the SCP 64 determines from the received information whether the call rang, but went unanswered. If someone answered the phone or the line is busy, the method 200 proceeds from step 236 to step 228, where the call is allowed to terminate in a normal manner, e.g., with the called or calling party hanging up. In some embodiments when the called party has call waiting, when the called line is busy the SCP returns the call to the SSP with a priority ring status assuming the calling party is determined to be a family member. In such embodiments if the called party has call waiting they will receive a priority call waiting tone versus the normal call waiting tone. Once the call is allowed to terminate, the processing of the detected call stops in step 229. While the processing of the detected call stops in step 229, the AIN trigger set at the SSP 2 remains active and may initiate processing of other calls to the family number at any time.

In step 236, if the SCP 64 determines that a no answer indication was received from the SSP 2, operation proceeds to decision step 238. In decision step 238, the SCP 64 determines from the calling party number if the calling party is listed in the emergency contact information table associated with the family, e.g., by comparing the calling party number to the telephone numbers listed in the ECIT 72. If the calling party number is listed, the method 200 proceeds directly to step 248. However, if the calling party number is not listed in the emergency contact information table 72, the method 200 proceeds from step 238 to step 240.

In step 240, the SCP 64 sends a message to the SSP 2, instructing the SSP to connect the call to the IP 10 and to have the IP 10 play a first message, identified as message 1, e.g., "please hold to be connected to voice mail". At this point of the method 200, if the caller is a family member, calling from a telephone which is not in the table 72, has the option of entering a PIN, thereby indicating the caller's status as a family member. In step 242, the IP 10 collects any entered information from the caller, e.g., digits of a PIN. In step 244, the IP 10 returns the call and any collected information to the SCP 64. Operation then proceeds to decision step 246, wherein the SCP 64 determines if a valid PIN was received. If received input does not match a valid PIN or no PIN was received, processing proceeds to step 247 wherein the SCP 64 instructs the SSP 2 to connect the call to the voice mail IP 31 so that the caller can leave a message if desired. Then in step 249 the SSP 2 connects the call to the voice mail IP 30. After the call is connected to the IP 30, it is allowed to terminate in the usual manner in step 228.

If in step 246 the SCP 64 determines that a valid PIN was received from the caller, the method 200 proceeds to step 248. In step 248, the SCP 64 transmits a message to the SSP 2 instructing the SSP 2 to reconnect the call to the IP 10 and for the IP 10 to play a second message, identified as message 2, to the caller. Operation proceeds from step 248 to step 252 via connecting node 250.

In step 252, the IP 10 plays Message 2 to the caller. Message 2 is a message that provides a list of the individuals who have provided emergency contact numbers. At this point, stored messages corresponding to the individuals who left contact numbers may also be played to the caller. In some embodiments, individuals leaving messages can designate those messages as being for specifically identified family members. In such an embodiment, messages left for specific family members are played if the entered PIN or calling party number corresponds to the person for whom the specific message was left. In step 254, the IP 10 prompts the calling party to select individuals or all of the members on the list of people who left contact numbers whom the caller would like to include in a conference call.

In step 258, the IP 10 receives the conference call selection information 256 from the caller. Then, in step 259, the IP 10 initiates a first billing call to the service subscriber, e.g., group contact service subscriber. In this exemplary embodiment the first billing call from the IP 10 is to the family telephone number which is to be billed for the service. Processing proceeds from step 259 to steps 260 and 268 in a parallel manner.

In step 268, the SSP 2 detects the call to the conference call subscriber, e.g., the TAT 3 is activated at SSP 2 by the first billing call from the IP 10. Then, in step 270, in response to the TAT 3, the SSP 2 pauses the billing call and sends a message, e.g., a TCAP message, to the SCP 64. Next, in step 272, the SCP 64 opens a CPR 73 corresponding to the called party number, e.g., family telephone number, indicated in the TCAP message. In step 274, the SCP 64 determines, from the calling party field of the TCAP message, that the call is from the conference IP 10, and should be treated as a billing call. Therefore in step 276, the SCP 64 stores the conference call start time, which may be, e.g., the current time and date obtained from an internal clock located in the SCP 64. Then, in step 278, the SCP 64 sends a response message to the SSP 2 instructing the SSP 2 to terminate the first billing call.

In step 260, the IP 10 places calls to each of the selected parties, e.g., by supplying the contact numbers submitted by the selected family members to the SSP 2 as dialed digits. Upon a selected party answering a call placed by the IP 10, method 200 proceeds to step 262 wherein the IP 10 bridges the call between the calling party and the answering party. As each called family member answers, the IP 10 adds the additional answering party to the conference call initiated by the first bridging operation. In this manner, the IP 10 can bridge in each called family member to establish a conference call between two, three or even more family members located at distinct locations. In step 264, the IP 10 detects when all the parties included in the conference call have hung up, terminating the conference call. Operation proceeds from step 264 to step 266.

In step 266, IP 10 initiates a second billing call to the conference call service subscriber, i.e., the family number. As part of the second billing call, the IP places the number of answered call or the number of conferencing call participants, depending on the embodiment, in an information field of the call, e.g., a billing field included with other SS7 information that forms part of the call. Operation proceeds from step 266 to step 282 through connection node 280.

In step 282, the SSP 2 detects the call to the conference call service subscriber, e.g., the TAT 3 is activated at SSP 2. In step 284, in response to the TAT 3, the SSP 2 sends a message, e.g., a TCAP message to the SCP 64. This TCAP message will include the billing information inserted into the billing field or another field of the second billing call by IP 10. Then, in step 286 the SCP 64 opens the CPR 73 corresponding to the called party number indicated in the received TCAP message. In step 288, following instructions in the CPR 73, the SCP 64 determines, from the calling party field of the TCAP message, that the call is from conference IP 10, and should be treated as a billing call. In step 290, the SCP 64 determines the number of calls or call participants to be used in billing the conference call from the billing field of the received call. In addition, the SCP 64 determines the conference call duration. Conference call duration may be determined by first determining the conference call stop time, for call determination purposes by consulting a local clock located in the SCP 64. The clock may include the time of day and the current date and be the same time used to determine the conference call start time in response to the TCAP message received from the SCP 64 in response to the first billing call. The SCP 64 determines the conference call duration by subtracting the conference call start time retrieved from memory from the conference call start time. In some embodiments, the start and stop times will correspond to the time the TCAP message corresponding to the first and second billing calls was received by the SCP 64 and therefore may differ slightly from the actual start and stop times associated with the conference call due to message passing delays. Any timing differences between the actual conference call start and stop conference call start times and the true conference call start and stop times due to using the SCP clock to time the call are likely to be minor. In addition, since the difference between the start and stop times is used to determine the conference call duration, the duration of the conference call will be highly accurate even if the start and stop times used to determine the duration are slightly behind the actual start and stop times of the conference call since the delay is likely to be consistent in both time determinations.

With the conference call billing information determined, e.g., the conference call duration calculated and the number of calls made or the number of call participants known, the SCP 64 can output the billing information in one of two ways. That is, the SCP 64 can use output device 68 to output the billing information, e.g., to the billing center 70 or transmit the billing information to the SSP to be charged to a service subscriber along with other telephone services billed by the SSP to the subscriber's telephone number. The SSP to which billing information is transmitted in accordance with this second option will normally be the SSP which serves as the end office switch for the subscriber who is to be billed, i.e., the switch responsible for generating a log of provided services to be billed to the subscriber's telephone number.

From step 290 operation proceeds to step 291. Step 291 is shown in dashed lines since it is performed when the SCP 64 is to output the conference call billing information via output device 68 and is skipped when the billing is to be performed through a switch. In step 291 the SCP 64 outputs conference call billing data using output device 68 to initiate billing to the conference call subscriber. The billing information may include subscriber identification information, e.g., the subscriber's telephone number, in addition to the other conference call billing information discussed above. Output device 68 may output the billing information in any one of a plurality of formats, e.g., in Bellcore AMA format (BAF) or ASCII format. In addition, it can transmit the billing information to the billing center 70 via communications link 72.

Operation proceeds from step 291 to step 292. In the event that an SSP is to be used to output the billing information instead of the SCP 64, operation would proceed directly from step 290 to step 292.

In step 292, the SCP 64 transmits a response message to the SSP 2, instructing it to terminate the second billing call. In addition, if the second billing option is used, wherein the switch is to output the billing data, an AMAslpID is included with the response message for billing purposes. In one exemplary embodiment, the AMAslipID includes an 8 digit service identifier and a call code that includes the relevant conference call billing information, e.g., the conference call duration and either the number of calls associated with the conference call or the number of call participants. The 8 digit service identifier identifies the type of service to be billed.

In step 296, the SSP 2 processes the message received from SCP 64. This includes terminating the second billing call in accordance with the received response message. In addition to terminating the second billing call, if an AMAslipID is received, the SSP 2 will output the conference call billing information to a billing log which is then provided to a billing center. The log includes the AMAslipID and the telephone number of the service subscriber to be billed for the conference call. When billing is performed in this manner, the charge for the conference call will normally be placed on the service subscriber's monthly telephone bill along with other charges associated with the subscriber's telephone number. In this way, a customer can review their monthly telephone activity in one bill.

With the conference call completed and billed, the method 200 stops in step 298. However, the TAT 3 remains active and may be triggered by a call to the service subscriber at any time.

Figure 3A:
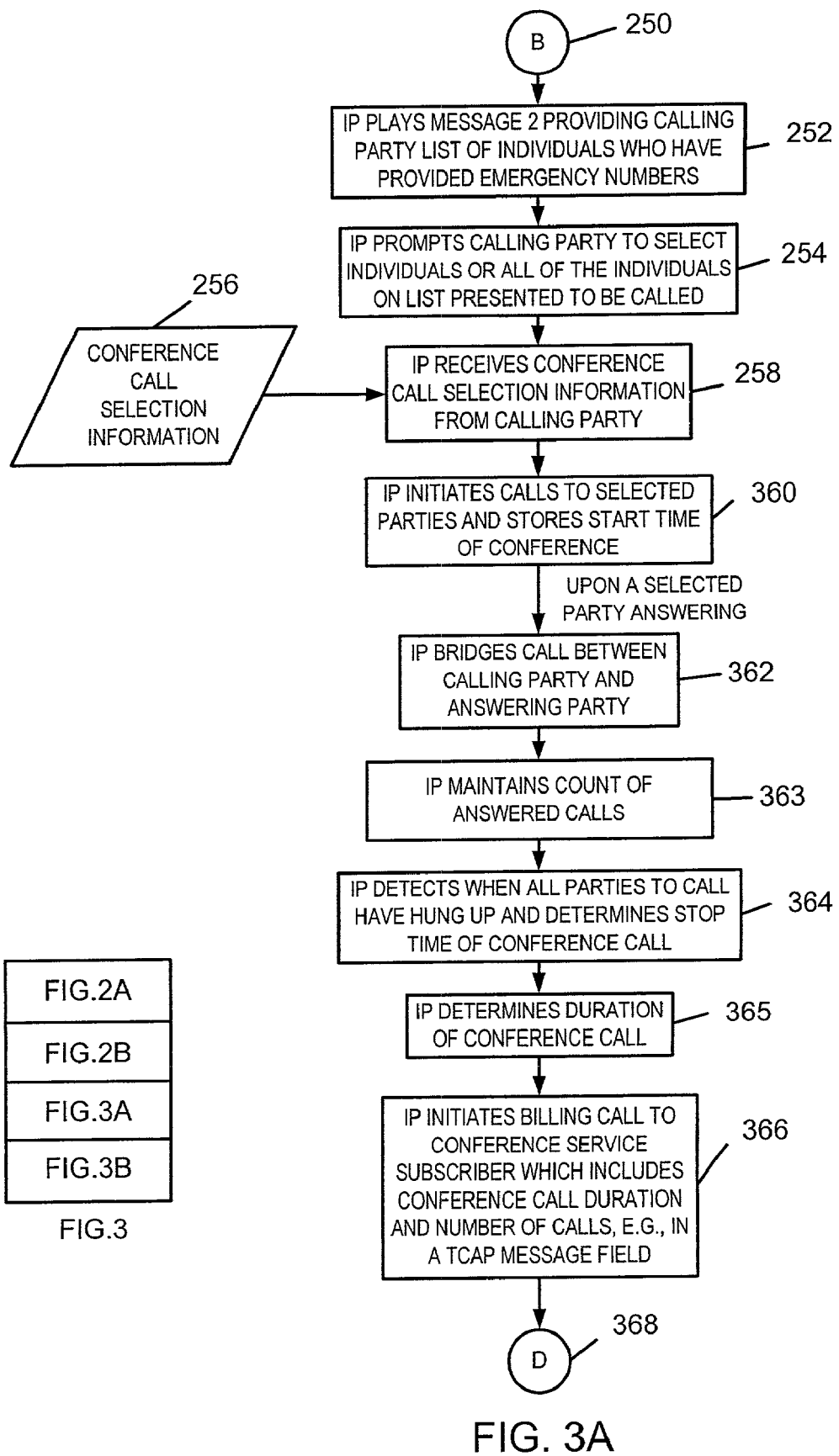
Figure 3B:
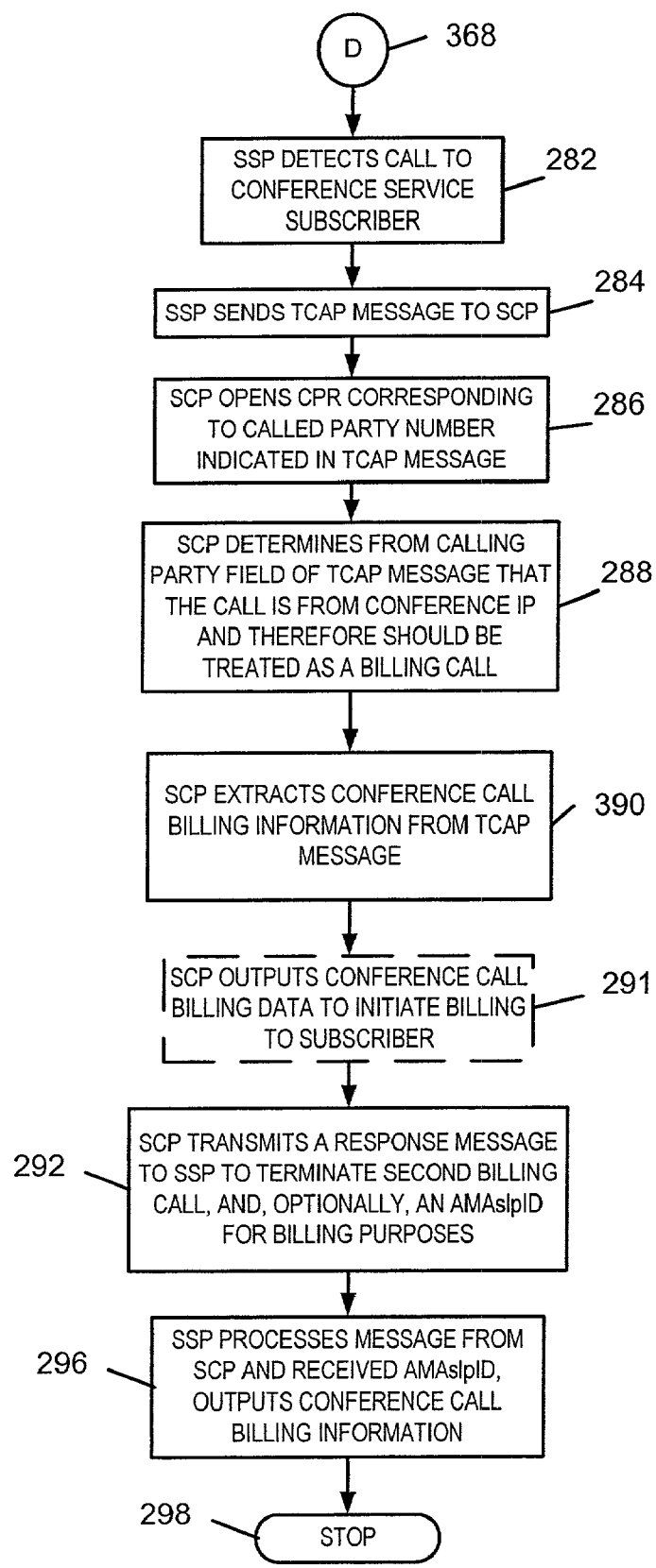

FIG. 3, which comprises the combination of FIGS. 2A, 2B, 3A and 3B, illustrates the steps of a second exemplary conference call billing method 300 of present invention. The conference call billing method illustrated in FIG. 3 uses one billing call as opposed to two billing calls with the peripheral device initiating the conference call being responsible for determining conference call duration. The second conference call billing is described in the context of the same exemplary group connection telephone service used to explain the first billing method.

The method shown in FIG. 3, like the method previously described with regard to FIG. 2, may be implemented by the system 100 shown in FIG. 1. Steps which are the same or similar between the FIG. 2 and FIG. 3 methods are described using the same reference numbers. Since steps 202 through 258 are the same as, or similar to, the steps of the FIG. 2 method they will not be described again.

In step 360, of FIG. 3A, the IP 10 places calls to each of the selected parties, e.g., by supplying the contact numbers submitted by the selected family members to the SSP 2 as dialed digits. It also stores the start time of the conference call, e.g., the time it begins dialing. Upon a selected party answering a call placed by the IP 10, method 300 proceeds to step 362 wherein the IP 10 bridges the call between the calling party and the answering party. As each called family member answers, the IP 10 adds the additional answering party to the conference call initiated by the first bridging operation. In this manner, the IP 10 can bridge in each called family member to establish a conference call between two, three or even more family members located at distinct locations.

In step 363, the IP 10 maintains a count of the number of answered calls. In this manner the IP 10 is able to keep track of the number answered calls and, if desired, the number of call participants (e.g., the number of answered calls plus the original caller). In step 364, the IP 10 detects when all the parties included in the conference call have hung up thereby terminating the conference call. In step 364 the IP 10 also determines the time the call was terminated, e.g., based on the same clock used to determine the conference call start time. Operation then proceeds to step 355 wherein the IP 10 determines the conference call duration, e.g., by calculating the difference in time between the conference call start and stop times.

With the billing information determined, in step 366 the IP 10 initiates a billing call to the service subscriber, e.g., the family number, to be billed for the conference call. The call includes, e.g., in a TCAP message field such as a billing field, the conference call billing information. As in the previously described billing embodiment, the billing information may include, e.g. conference call duration information and the number of call participants or the number of completed calls included in the conference call. Operation proceeds from step 366 to step 370, through connection node 368 to step 282 of FIG. 3B.

Figure 2A:
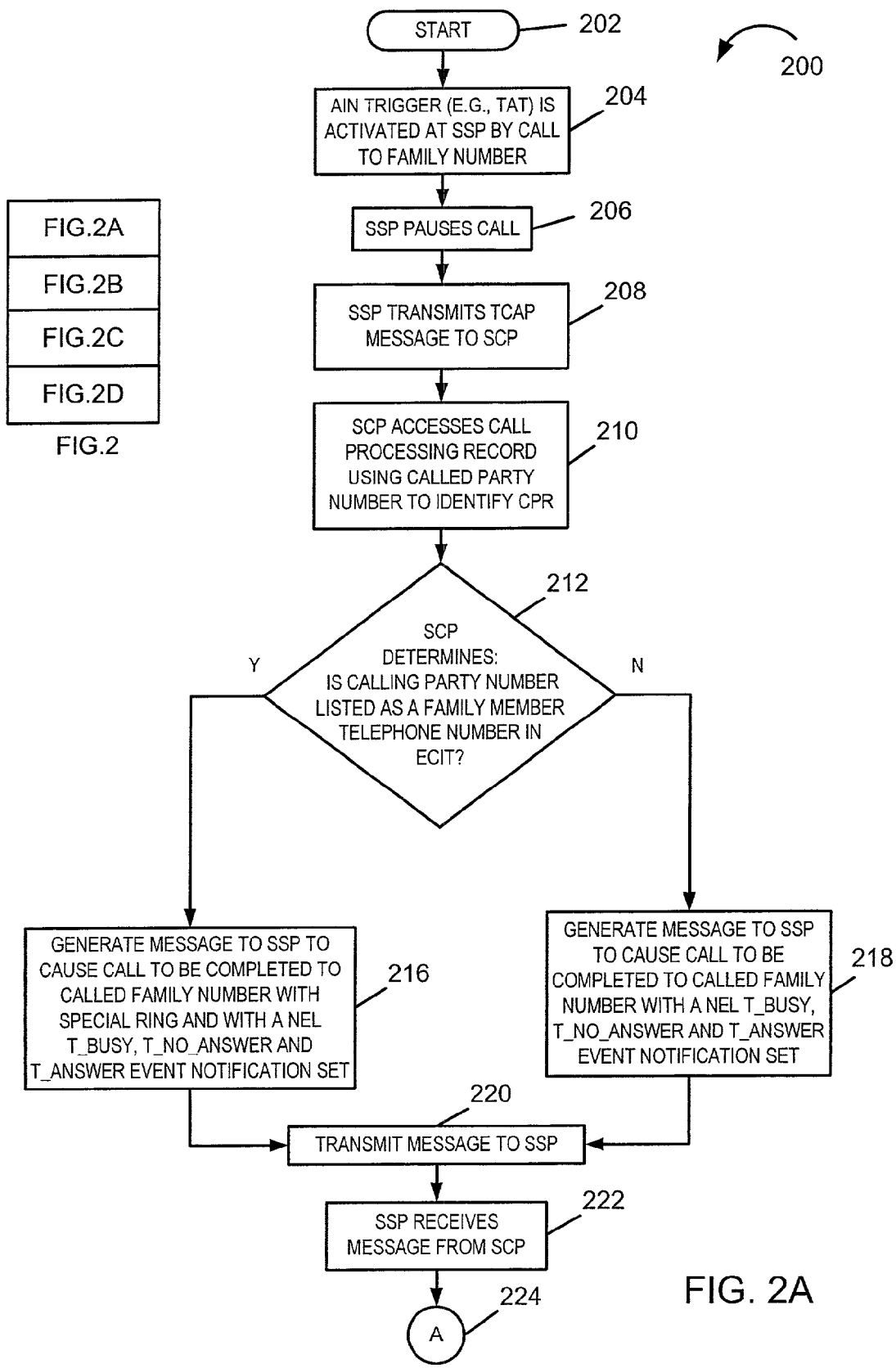
FIG. 2 and FIG. 3 are flow diagrams illustrating the steps of exemplary conference call billing methods of the present invention.
Figure 2B:
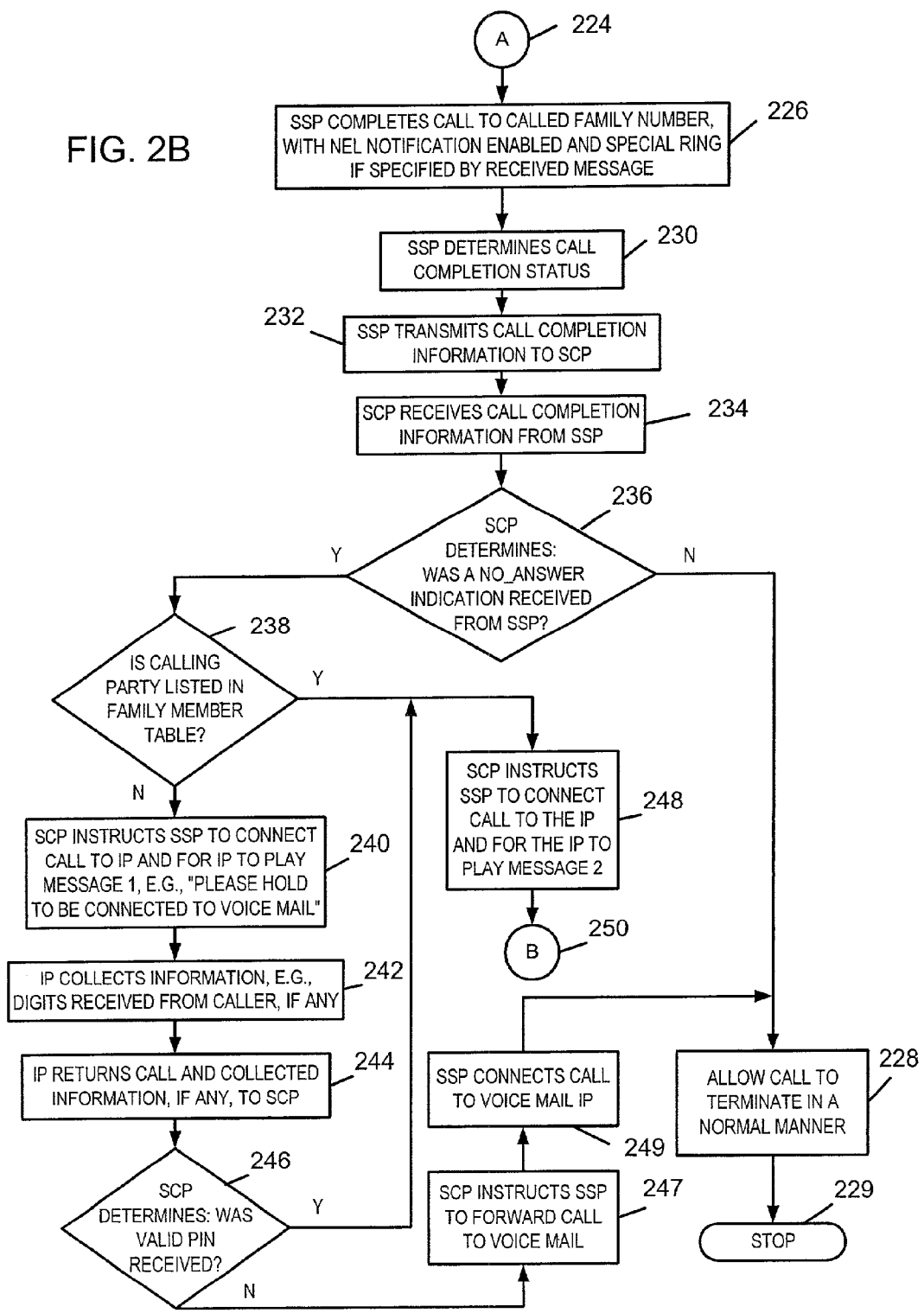
Figure 2C:
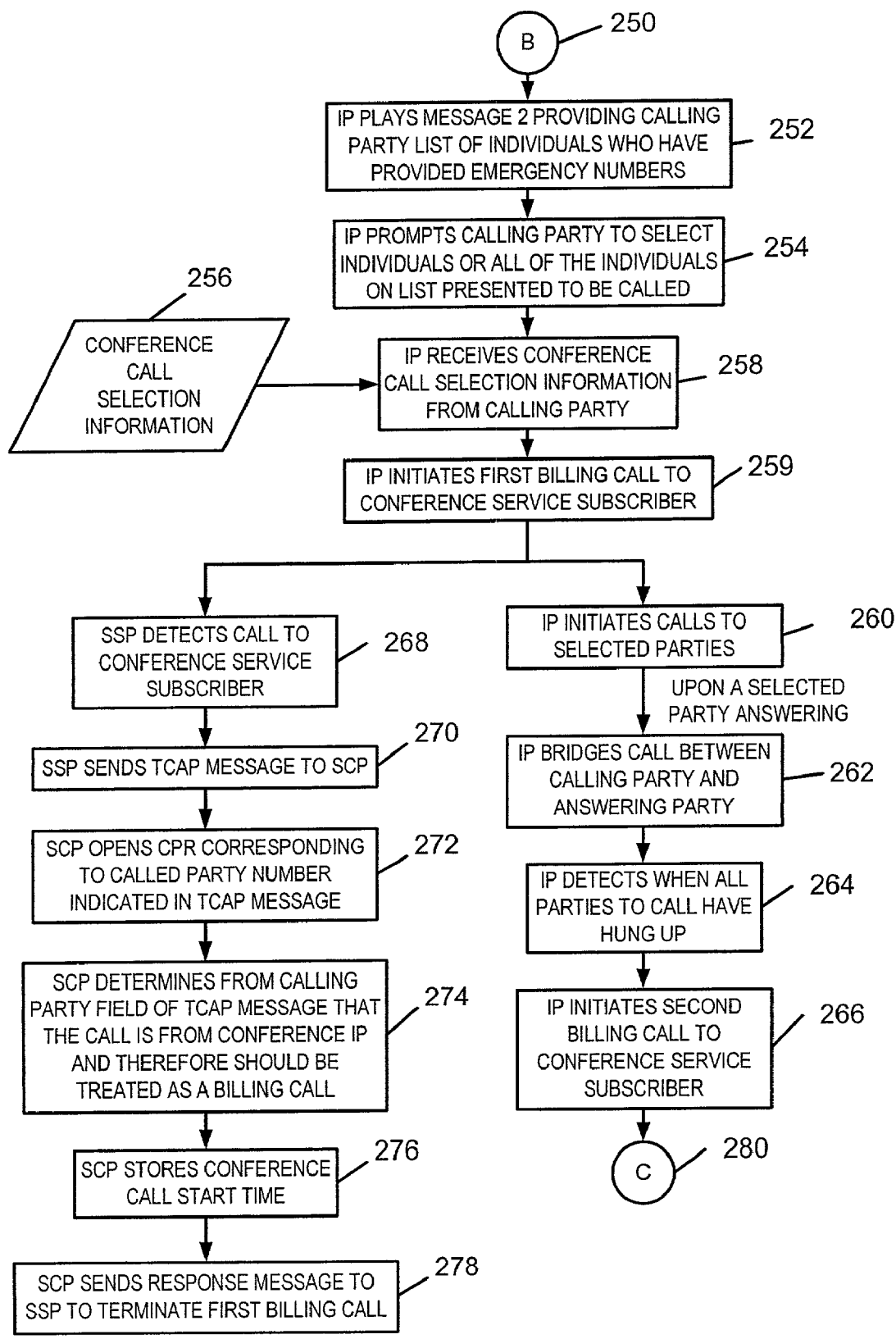
Figure 2D:
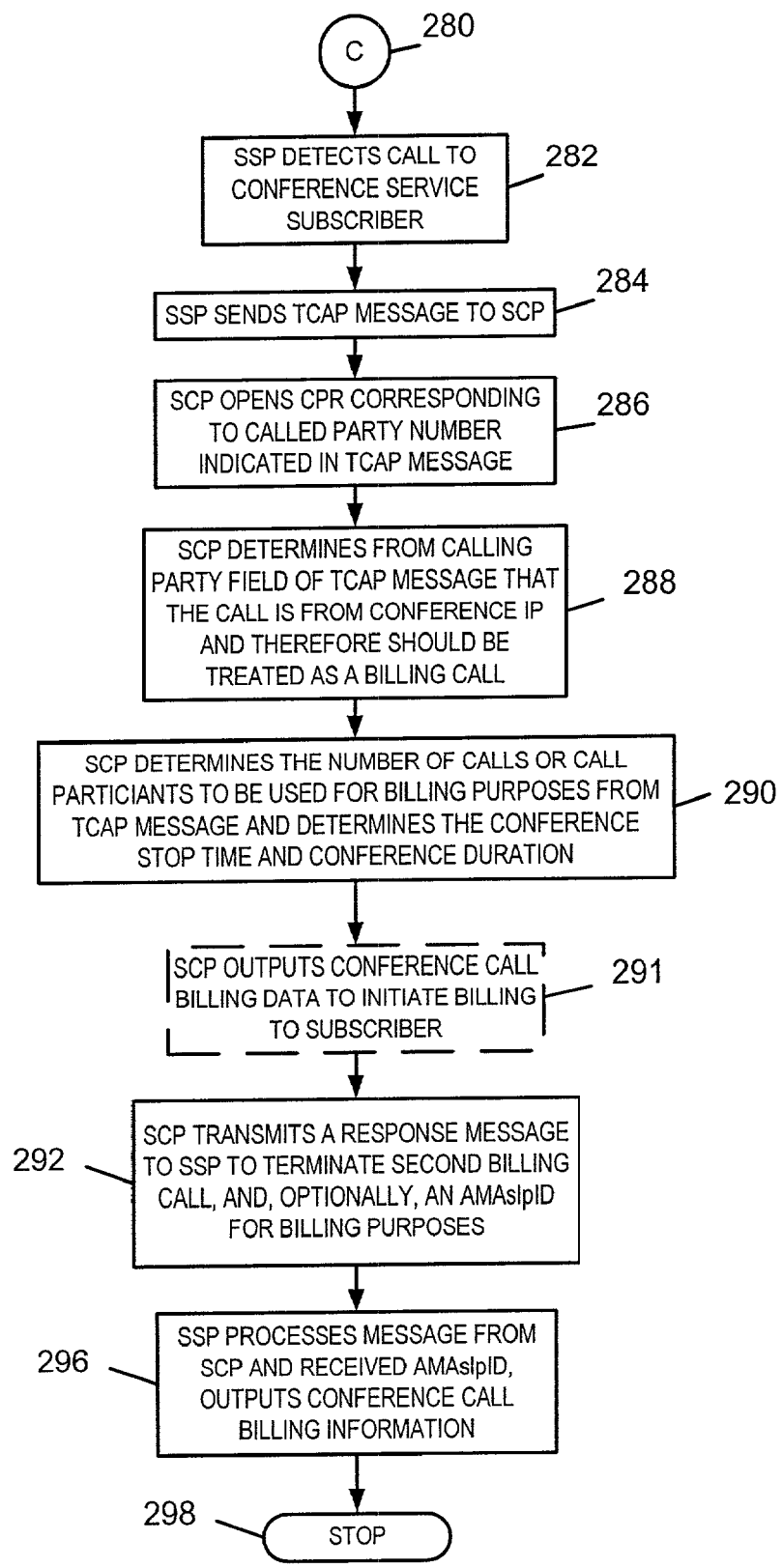

Steps 282 through 288 of FIG. 3B are the same as those previously discussed with regard to FIG. 2D and therefore will not be described in detail again. FIGS. 2D and 3B differ in that step 390 replaces step 290. In step 390, the SCP 64 determines the conference call billing information, including conference call duration, from the received TCAP message. Since conference call duration information which was calculated by the IP 10 is received in the TCAP message, there is no need for the SCP 64 to independently calculate the conference duration information. After the conference call billing information is obtained in step 390 operation proceeds to step 291 or step 292 depending on whether the SCP 64 is to directly output the billing information or if the conference call is to be billed via SSP 2. Steps 291 through 298 are the same as, or similar to, the same steps previously described in regard to FIG. 2D and therefore the discussion of these steps will not be repeated.

In the FIG. 3 embodiment, it can be seen that the burden of determining the conference call duration is placed on the conference IP 10 as opposed to the SCP 64. This allows a single billing call to be used to convey billing information to the SCP 64 as opposed to two calls as in the previously described embodiment. While the reduction in the number of calls might seem advantageous, the transactional cost of the additional call in the first embodiment is probably relatively small given the call's short duration. Furthermore, given that SCPs often include more computational capacity then peripheral devices, it may be desirable in some cases to place the burden of calculating conference call duration on the SCP 64 thereby relieving the conference IP 10 of this burden.

Numerous variations on the above described methods and apparatus are possible without departing from the scope of the invention. For example, while the billing techniques of the present invention are described in the context of a conference calling service, the same techniques may be used to convey billing information to an SCP 64 for other telephony services. Such services could then be billed via the billing information collected by the SCP 64.

What is claimed is:

1. A method of billing for a communications service implemented using a telephone network, the method comprising the steps of:
    operating a peripheral device located in the telephone network to initiate a call directed to a telephone number corresponding to a party to be billed for said communications service, said step of initiating a call including incorporating billing information into a data field included in said call;
    operating a trigger set at a telephone switch to detect said call directed to said telephone number;
    in response to said trigger detecting said telephone call, generating a message including said billing information; and
    transmitting said message to a service control point.

2. The method of claim 1, further comprising the step of:
    operating the service control point to receive said message and to access at least some of said billing information.

3. The method of claim 2, wherein said accessed billing information includes at least one of: a number of conference call participants, a number of telephone calls and information about the amount of time a service to be billed was provided.

4. The method of claim 3, further comprising:
    operating the service control point to output at least some of said billing information via an output device.

5. The method of claim 1, wherein said call is a second call, the method further comprising:
    prior to initiating the second call,
    initiating a first call to said telephone number corresponding to the party to be billed;
    operating the trigger set at the telephone switch to detect the first call directed to said telephone number; and
    in response to said trigger detecting said telephone call, the switch transmitting a first message to the service control point.

6. The method of claim 5, further comprising the step of:
    operating the service control point to determine the amount of time for which said communications service is to be billed as a function of the difference in time between when said first message is received and when said message including said billing information is received.

7. The method of claim 6, further comprising the step of: operating the service control point to instruct the switch to terminate said first telephone call.

8. The method of claim 1, further comprising: operating the service control point to send said at least some of said billing information to said telephone switch along with a response message.

9. The method of claim 8, wherein said billing information is transmitted to said telephone switch in the form of an AMAslipID.

10. The method of claim 8, wherein said response message instructs the telephone switch to terminate said call.

11. The method of claim 10, wherein said billing information set to the switch includes information indicating the amount of time the service to be billed was provided.

12. The method of claim 11, wherein the billing information sent to the switch indicates the type of service to be billed.

13. The method of claim 11,
wherein the duration information is conference call duration information; and
wherein said billing information further indicates the number of conference call participants.

14. The method of claim 11, wherein said billing information is transmitted to said telephone switch in the form of an AMAslipID.

15. The method of claim 12, wherein the duration information is conference call duration information; and wherein said billing information further indicates the number of completed telephone calls which where included.

16. The method of claim 1, wherein the data field is other than a field containing the called number.

17. A system for billing a communications service implemented using a telephone network, the system comprising:
a telephone switch including a trigger set to detect calls directed to a subscriber telephone number which may be billed for said communications service and for generating a message including call information in response to activation of said trigger;
a peripheral device located in the telephone network coupled to said telephone switch, the peripheral device including:
i. means for initiating a call directed to the telephone number corresponding to a party to be billed for said communications service;
ii. means for including communications service billing information in a field of said initiated call; and
a service control point including means for responding to a message generated by said telephone switch in response to activation of said trigger by extracting billing information from said message which was obtained by the switch from said call.

18. The communications system of claim 17, wherein said communications device is a telephone switch peripheral device including:
conference calling capability.

19. The communication system of claim 17, wherein said communications device provides at least a portion of said communications service, the communications device further comprising:
means for determining the amount of time the communications service to be billed was provided; and
means for including the determined amount of time in a field of said initiated call.

20. The communication system of claim 19, wherein said trigger is a terminating attempt trigger.

21. The communication system of claim 17, wherein said service control point includes:
means for determining the time for which said communications service is billed from the difference in time between when a first message is received from said telephone switch and a second message is received from said telephone switch in response to first and second calls made by said communication device to the subscriber telephone number.

22. A method of billing for a communications service implemented using a telephone network, the method comprising the steps of:
operating a peripheral device located in the telephone network which provides at least a portion of said communications service to place a call to a telephone number corresponding to a party to be billed for said communications service, said step of placing a call including incorporating billing information into a field included in said call;
operating a terminating attempt trigger set at a telephone switch to detect each call directed to said telephone number;
in response to said trigger being activated by said placed telephone call, generating a message directed to a service control point including said billing information; and
operating a service control point to access at least some of said billing information from said message.

23. The method of claim 22, further comprising:
billing the party corresponding to said telephone number to which the placed call was directed for said communications service using at least some of the billing information accessed by said service control point.

24. The method of claim 23, wherein the step of billing the party includes:
operating the service control point to transmit said at least some of the billing information to a telephone switch in conjunction with a message to terminate said placed call.

25. The system of claim 17, wherein the field is other than a field containing the called number.

* * * * *